United States Patent [19]
Matulka

[11] Patent Number: 5,113,079
[45] Date of Patent: May 12, 1992

[54] NON-DESTRUCTIVE TESTING OF AIRCRAFT FOR STRUCTURAL INTEGRITY USING HOLOGRAPHIC MOIRE PATTERNS

[76] Inventor: Robert D. Matulka, 3531 Half Moon Cir., Falls Church, Va. 22044-1311

[21] Appl. No.: 577,509

[22] Filed: Sep. 5, 1990

[51] Int. Cl.⁵ .............................................. G02B 27/42
[52] U.S. Cl. ...................................... 250/550; 73/802; 356/347; 359/10
[58] Field of Search ................... 250/561, 562, 550; 356/32, 35.5, 347, 348; 73/800, 802, 656; 350/3.6; 359/1, 10, 22, 24, 32, 23, 28

[56]  References Cited
U.S. PATENT DOCUMENTS

| | | | |
|---|---|---|---|
| 3,619,064 | 9/1968 | Brooks | 356/347 |
| 3,644,047 | 2/1972 | Brown et al. | 356/348 |
| 3,729,249 | 4/1973 | Habegger et al. | 356/347 |
| 3,911,733 | 10/1975 | Bhuta et al. | 73/802 |
| 4,084,427 | 4/1978 | Jacoby et al. | 356/32 |
| 4,506,981 | 3/1985 | Hoff, Jr. | 356/347 |
| 4,981,360 | 1/1991 | Schwarz | 356/32 |
| 5,041,726 | 8/1991 | Chang et al. | 356/347 |

OTHER PUBLICATIONS

AGARD, "Evaluation of the Potential Benefit to the Aeronautical Field from Laser Technology", No. 195, Published Dec. 1974, Chapter 12, pp. 1-23.

Primary Examiner—David C. Nelms
Assistant Examiner—John R. Lee
Attorney, Agent, or Firm—Sherman and Shalloway

[57] ABSTRACT

A method of using the classic principles of moire patterns and holography to provide defect analysis of variable sensitivity on structures of various sizes, including large aircraft. By taking several holograms (usually a series of four) of the structure which has been illuminated with dual (or multiple) beams of coherent illumination (e.g. laser), each hologram will record an image of the test object which includes an interferometric fringe pattern on the surface. The spacing and orientation of the fringe pattern can be varied by the arrangement and nature of the dual illumination beams.

19 Claims, 6 Drawing Sheets

NON-DESTRUCTIVE TESTING OF AIRCRAFT FOR STRUCTURAL INTEGRITY USING HOLOGRAPHIC MOIRE PATTERNS

BACKGROUND OF THE INVENTION

1. Field of the Invention:

The present invention relates to holographic moire pattern interferometry and, more particularly, to its application to the non-destructive testing of aircraft for structural integrity.

2. Description of the Prior Art:

The usual techniques, well-known in the field of non-destructive testing, are briefly discussed:

HOLOGRAPHY

Holography was first invented by Gabor in 1949 as an improvement to microscopy. It is now a familiar technique for capturing a total optical wavefront on a film. Reconstructed by illuminating the developed film with one of the two beams used to record the hologram will reconstruct both beams (plus diffracted side order beams).

HOLOGRAPHIC INTERFEROMETRY:

Interferometry has been an important application of holography since the 1960's. An outgrowth of conventional interferometry, holographic interferometry has been practically applied to test objects for laboratory size up to intermediate size. It is commonly used on airline maintenance to test aircraft tires for internal debonds of the laminations. Variants include speckle pattern interferometry and sandwich holography.

MOIRE PATTERNS

Moire patterns and moire pattern analysis have been used in the areas of scientific testing, motion measurement and calibration, and entertainment for many years (at least since the 1800's). While a great deal of work has been done on the theoretical measurement of deformities, no known work has focussed on the application of large scale, motion insensitive, qualitative defect identification as is the focus of this invention.

HOLOGRAPHIC NON-DESTRUCTIVE TESTING:

The application of holography to non-destructive testing techniques previously done by classical optics has grown rapidly since the 1960's Principal methods have included the high pulse power and short duration time available for photographic and holographic recordings that are available with a pulse laser. Also included have been the methods for double pulsed holograms and holographic interferograms previously referred to above, as well as interferograms of the natural speckle patterns, and the use of two or more holographic plates to adjust for fixed body motion. Two primary applications that relate closely with this invention have been the several applications of dual holograms or double exposure holograms of an object in two different states of strain, or surface deformation, and the applications of various combinations of grid patterns on test objects which have then been optically compared with a temporally or spatially modulated second beam to provide moire pattern effects. None of these techniques have allowed the post facto calibration and analysis of recorded patterns, particularly on large scale objects in industrial environments, which is the subject of this patent.

AIRCRAFT TESTING

Several testing techniques have been proposed which use holographic interferometry for recording the surface of an aircraft structure before and after (or during) a strain situation. These techniques are limited in sensitivity by the wavelength of the recording illumination, since interferences of much more than 20 wavelengths of the recording illumination are difficult to record or analyze. These techniques are very powerful for detail testing of small regions or parts and are to be considered complimentary to the subject of this patent.

SUMMARY OF THE INVENTION

Accordingly, it is one object of the present invention to provide a rapid method for the non-destructive testing of large objects to determine the presence of areas of non-uniform strain therein.

It is a further object of the present invention to provide a method for the non-destructive testing of airplanes to determine the presence of areas of non-uniform strain.

It is a still further object of the present invention to provide apparatus for the non-destructive testing of airplanes, and other such objects, to determine the presence of areas of non-uniform strain therein.

These and other objects of the present invention, as will become apparent hereinafter, have been achieved by the provision of a method of non-destructively testing an object to determine the presence of areas of non-uniform strain, comprising: projecting a reference interference pattern on a surface of an object to be non-destructively tested for areas of non-uniform strain, the object being in a first stressed condition; recording a first hologram of said surface, with said reference interference pattern projected thereon, at a first time in said first stressed condition on a first holographic recording medium; recording a second hologram of said surface, with said reference interference pattern projected thereon, at a second time in said first stressed condition on a second holographic recording medium; inducing a second state of stress in said object to put said object into a second stressed condition; recording at least one additional hologram of said surface, with said reference interference pattern projected thereon, in said second stressed condition on a respective at least one additional holographic recording medium; superposing said first and second holograms to generate a moire pattern revealing normal surface irregularities of said object in said first stressed condition; and superposing one of said first and second holograms and one of said at least one additional hologram to generate a moire pattern revealing areas of stress-induced non-uniform strain on said surface of said object.

In a preferred embodiment, the present invention provides a method of non-destructively testing an object to determine the presence of areas of surface and underlying nonuniform strain, comprising: projecting a reference interference pattern on a surface of an object to be non-destructively tested for areas of non-uniform strain, said object being in a first stressed condition; recording a first hologram of said surface, with said reference interference pattern projected thereon, at a first time in said first stressed condition on a first holographic recording medium; recording a second hologram of said surface, with said reference interference pattern projected thereon, at a second time in said first stressed condition on a second holographic recording medium; inducing a second state of stress in said object to put said object into a second stressed condition; recording a third hologram of said surface, with said reference interference pattern projected thereon, at a first time in said second stressed condition on a third holographic recording medium; recording a fourth hologram of said surface, with said reference interference pattern projected thereon, at a second time in said second stressed condition on a fourth holographic recording medium; superposing said first and second holograms to generate a moire pattern revealing normal surface irregularities of said object in said first stressed condition; superposing said third and fourth holograms to generate a moire pattern revealing normal surface irregularities of said object in said second stressed condition; and superposing one of said first and second holograms and one of said third and fourth holograms to generate a moire pattern revealing areas of stress-induced non-uniform strain on said surface of said object. The illumination and viewing angles should be acute to the surface such that the moire pattern moves with normal (i.e. perpendicular) strain, for best effect.

In a particularly preferred embodiment of the present invention, the aforementioned non-destructive testing technique is applied to geriatric aircraft in order to ascertain localized areas of possible structural failure or incipient structural failure.

In another aspect, the present invention provides an apparatus for the non-destructive testing of a longitudinally extending object, having a top, a bottom, a port side, a starboard side, and a surface area defined by a top port side quadrant, a top starboard side quadrant, a bottom port side quadrant and a bottom starboard side quadrant, to determine the presence of areas of non-uniform strain, comprising at least one test station, said test station comprising: laser means for generating a pulsed laser beam; first projection means, optically operatively connected to said laser means, for projecting a first reference interference pattern on a predetermined length of said top port side quadrant of said object to illuminate said predetermined length of said top port side quadrant of said object, upon receipt of a laser pulse; second projection means, optically operatively connected to said laser means, for projecting a second reference interference pattern on a predetermined length of said top starboard side quadrant of said object to illuminate said predetermined length of said top starboard side quadrant of said object, upon receipt of a laser pulse; third projection means, optically operatively connected to said laser means, for projecting a third reference interference pattern on a predetermined length of said bottom port side quadrant of said object to illuminate said predetermined length of said bottom port side quadrant of said object, upon receipt of a laser pulse; fourth projection means, optically operatively connected to said laser means, for projecting a fourth reference interference pattern on a predetermined length of said bottom starboard side quadrant of said object to illuminate said predetermined length of said bottom starboard side quadrant of said object, upon receipt of a laser pulse; first holographic recording means, optically operatively connected to said laser means, for recording a holographic image of said predetermined length of said top port side quadrant of said object when said predetermined length of said top port side quadrant of said object is illuminated by said first projection means; second holographic recording means, optically operatively connected to said laser means, for recording a holographic image of said predetermined length of said top starboard side quadrant of said object when said predetermined length of said top starboard side quadrant is illuminated by said second projection means; third holographic recording means, optically operatively connected to said laser means, for recording a holographic image of said predetermined length of said bottom port side quadrant of said object when said predetermined length of said bottom port side quadrant of said object is illuminated by said third projection means; fourth holographic recording means, optically operatively connected to said laser means, for recording a holographic image of said predetermined length of said bottom starboard side quadrant of said object when said predetermined length of said bottom starboard side quadrant is illuminated by said fourth projection means. (Due to variations in the shape (e.g. curvature) of aircraft, it may be necessary to view the surface of the fuselage of an aircraft from more than the four positions noted above. Thus, it may be necessary to divide the circumference of the aircraft into more than four (e.g., 6, 6, etc.) viewing quadrants to effectively view the entire surface of the aircraft. This may require repositioning of the previously noted equipment so that the entire surface is not viewed substantially simultaneously but in discrete increments or the addition of equipment to allow substantially simultaneous viewing of all portions of the aircraft surface.

DETAILED DESCRIPTION OF THE INVENTION

This invention applies to a new method for testing objects for fatigue effects. For example, it may be applied to the testing of geriatric aircraft structures to determine the effects of aging on the structural integrity of their fuselage structures. It applies to objects of all sizes, and is particularly effective on large objects such as whole airplanes or ships. The basic technique consists of the dual recording of coherently generated fringes on the surface of the structure in two states of strain. The interference of the two patterns, which will be relatively displaced in regions of different strain, will illustrate those regions which have suffered unusual, or non-linear strain effects. Those are precisely the regions which should be further investigated for cracks, debondments, or other defects.

To accomplish these holographically recorded moire pattern analysis images, one records a hologram of the test object with two (or three, for orthogonal aspect) illumination (scene) beams. This results in a hologram of the test object as it is illuminated by a grating pattern. The spacing of the grating pattern is a direct result of the spacing between the two (or three) illumination beams. The orientation of the grid is a result of the orientation of the two illumination beams, the grid lines being perpendicular to the line between the two beam sources. The second recording, on a second carefully placed hologram in front of or behind the first hologram, will record a second grating on the same test surface after it has experienced some difference in stress which has resulted in a deformation strain. The simultaneous reconstruction of both hologram views shows the moire interference pattern of the two grids on the test object. Because these grids can be oriented and spaced according to best advantage, the unusual deformations or non-linear changes in pattern such as might result from cracks in the surface, or under the surface, will show up as non-regular moire patterns. It is in this way that the technique becomes valuable for defect analysis. The technique is similar to conventional holographic interferograms for defect analysis except that it relates to the interference of the implaced grid patterns instead of the basic coherent illumination. The procedure may also be accomplished completely non-coherently by the dual recording of photographs of focussed grids on the test surface in two states of strain. The non-coherent application, very old in the testing business, is extremely difficult, and very limited.

To provide necessary reference information between the first and second states of strain, one repeats each exposure twice for a total of four holograms, two each at two states of strain. In this way later analysis can be made to differentiate between normal deformities in the surface, and deformities that are due to irregular strain. This irregular strain is the target of the analysis, since it relates to flaws or failures in the test object. After development, analysis may be made on any combination of the four plates viewed simultaneously. The number of fringe shifts that one observes is a function of the fringe spacing, the deformation amount, and the angles of illumination and viewing. One optional use of the dual exposures at each state of strain is to utilize different illumination fringe spacings (and/or orientation) to allow a larger latitude of sensitivities as required by the nature of the specific test. Much of this discussion relates to comparison of the two views at different states of strain, after calibration comparisons have identified the "normal" surface states.

By reconstructing the two views on carefully placed independent holograms, one has the opportunity to vary the resulting moire interference pattern in post facto analysis to achieve the best moire orientation for observation of the spatial deformation (defect) of interest. In this way one can use the same set of holograms to analyze a very large object for different kinds of defects at leisure after the test has been made. Such a capability is very valuable for testing the geriatric effects of aircraft fuselages or other components, where the scale of the strain deformation can become too large for practical analysis by conventional holographic interferometry and normal surface irregularities can be large enough to mask strain effects on moire patterns alone. Variations of this technique include, first, the variation of fringe spacing and orientation implanted on the illumination of the test object. Multiple exposures of the same set of holograms with different hologram reference beam orientations can result in simultaneous reconstruction of a variety of grid orientations and spacings, thus allowing variable sensitivities to deformation geometries and scales. That is, one can record on each of the two holograms several grid spacings and orientations such that a variety of sensitivities to deformation position and orientation is available for later analysis and fault detection. It is in this way that the technique achieves its greatest power as a defect identification tool for objects of any size.

A key feature of the multiple hologram recording technique is that it allows the post facto realignment of the relative position of the test object during analysis. In fact, large objects in industrial environment move many millimeters during the course of a recording sequence covering two states of stress/strain. The majority of this is just from normal hangar environments, wind flows, and noise induced vibrations. Large aircraft expand as much as two millimeters in diameter just from the normal pressurization process. These dimensional instabilities are intolerable in the normal application of similar techniques in a laboratory environment.

One of the post facto realignments that is uniquely available from the holographic recordings used for this test, is the fact that one can realign the before and after plates with sufficient accuracy to obtain basic holographic interferometry methods and their high sensitivity on localized areas. That is, the method can be made to reduce to holographic interferometry for any selected area. Most normal holographic interferometry techniques (e.g. shearing interferometry) can be used on suspect areas. The ability to use telephoto lenses through the hologram reconstruction also allow one to magnify those areas up to the limits of laser speckle. To minimize laser speckle, large holographic apertures are preferred in the overall system design.

By taking several of the holographic moire pattern interferograms either sequentially or simultaneously, one can capture the defect status of a whole aircraft.

Figure 1A:
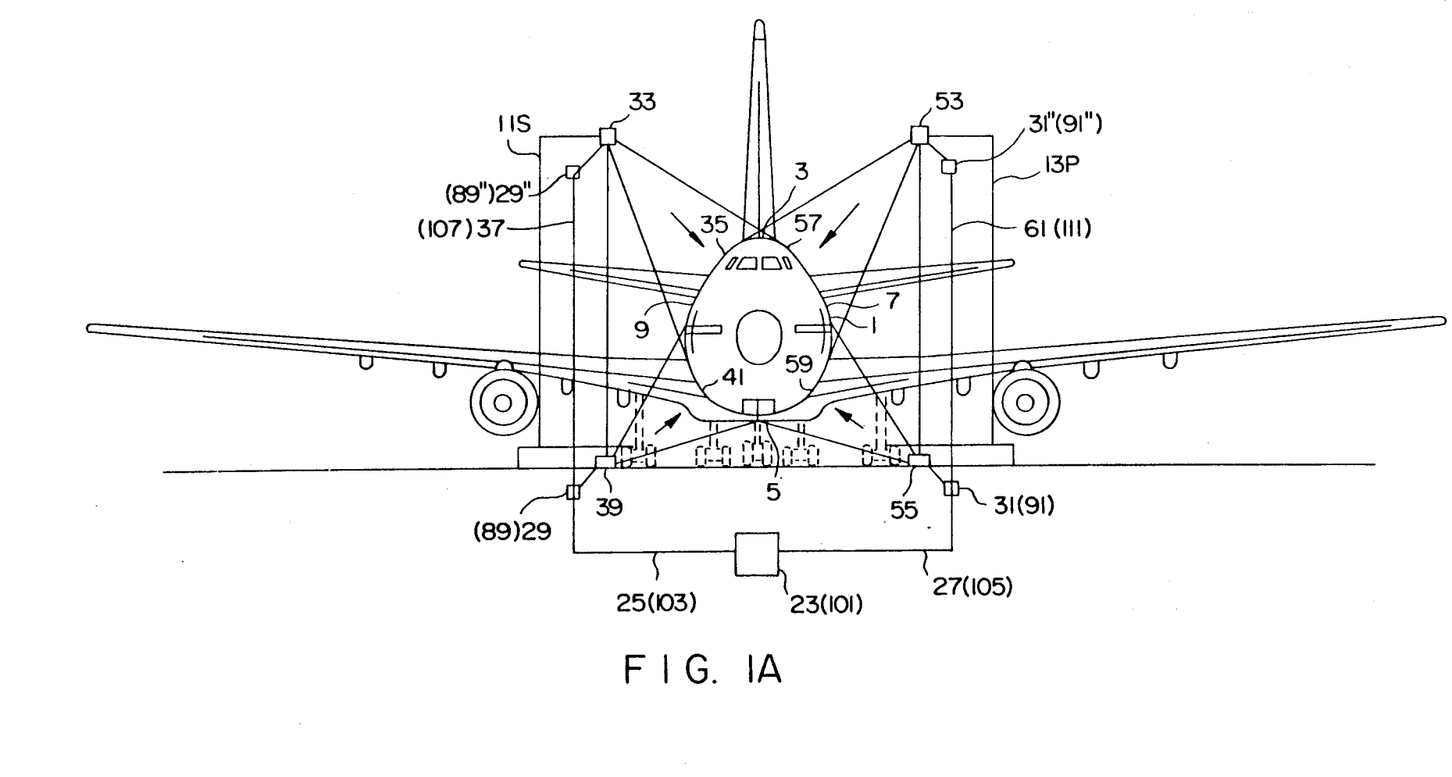
FIG. 1A is a front view of a commercial airliner illustrating the projection of a reference interference pattern onto the aircraft fuselage.
Figure 1B:
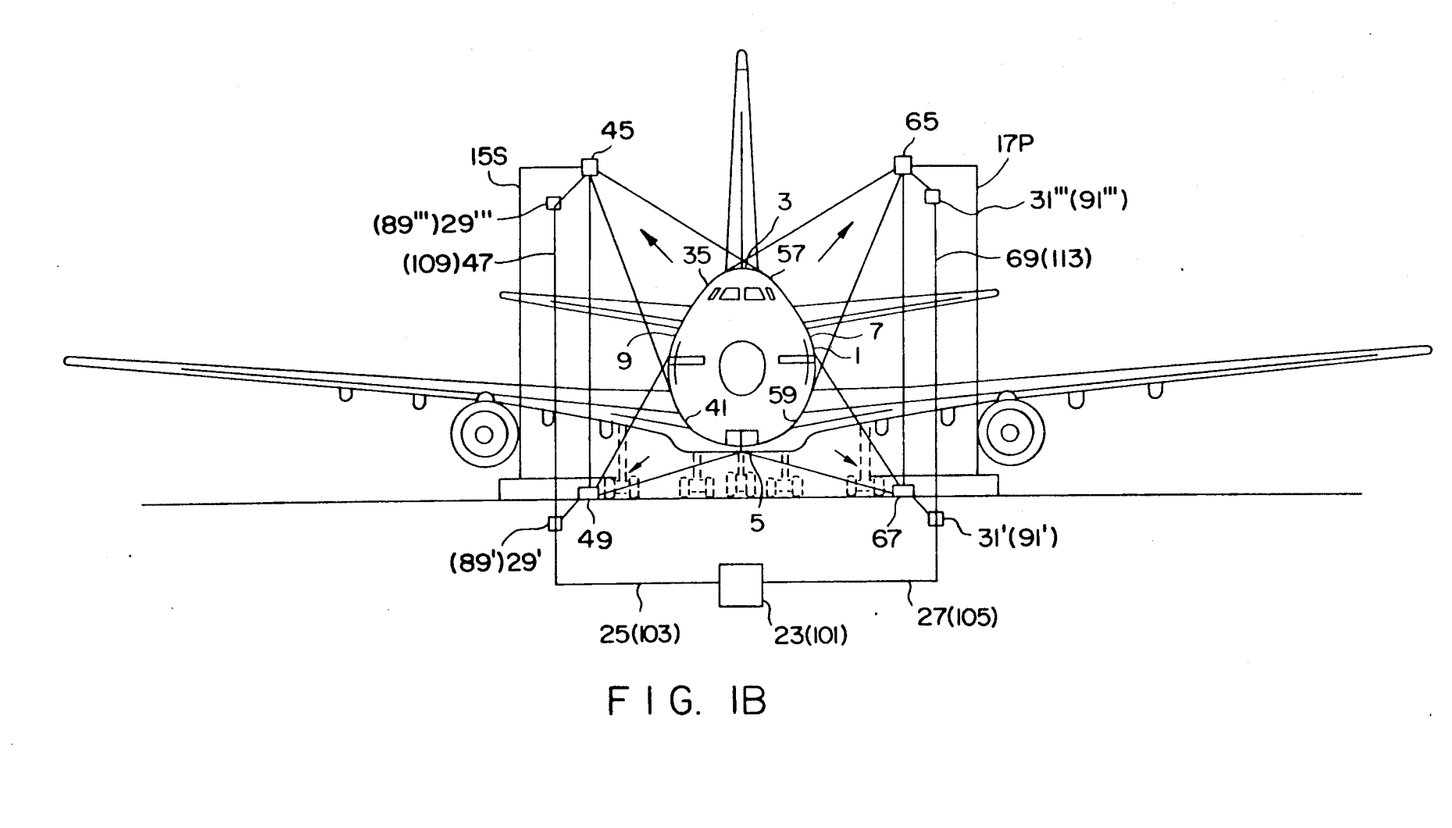
FIG. 1B is a front view of a commercial airliner illustrating the taking of holographic images of the aircraft fuselage which is being subjected to the projection of a reference interference pattern as illustrated in FIG. 1A.
Figure 2:
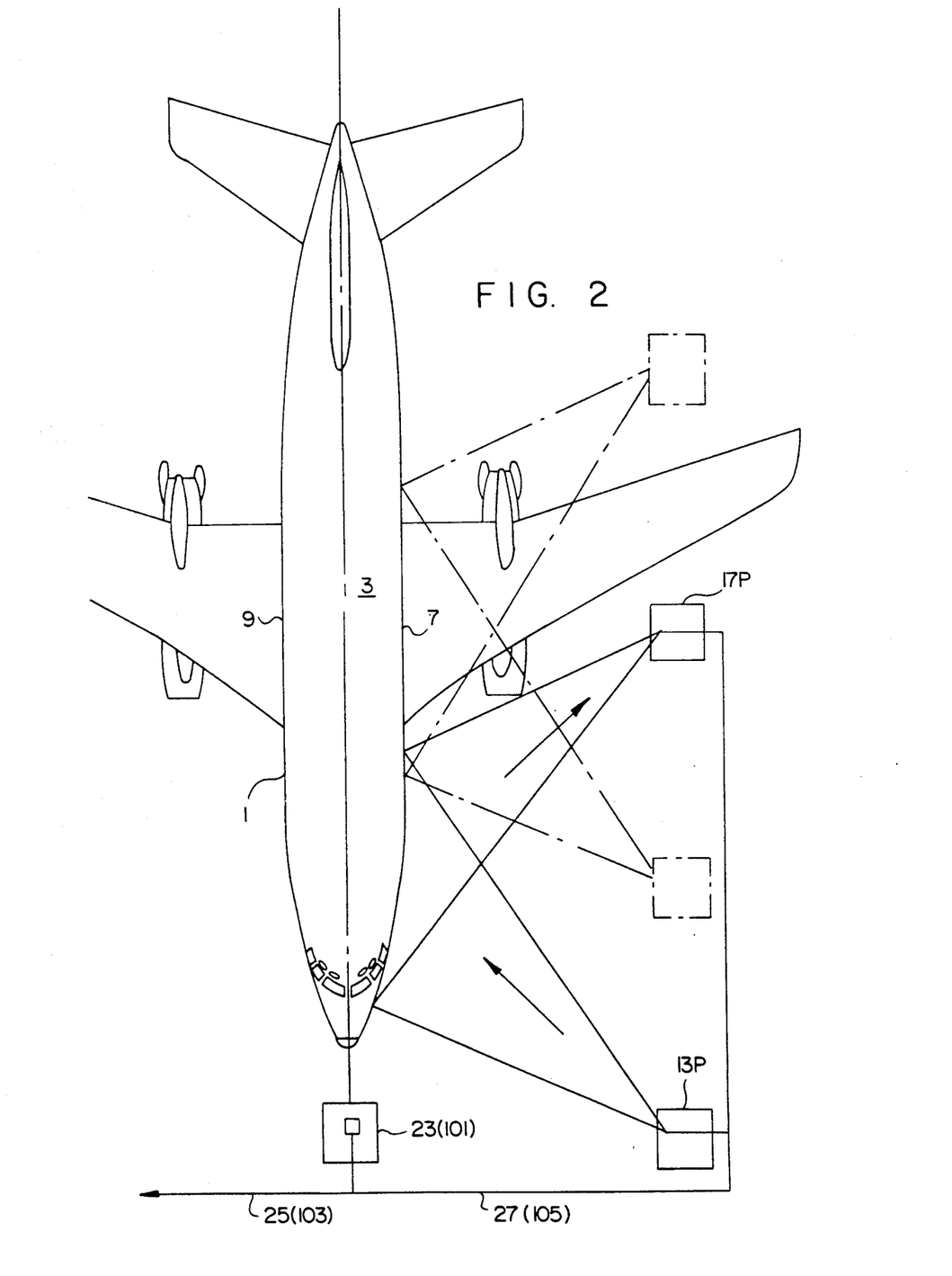
FIG. 2 is a top view of a commercial airliner showing the relative positioning of test stations, along the port side thereof, according to the present invention for non-destructive testing by the method of the present invention.

FIGS. 1A, 1B and 2 illustrate an apparatus in accord with the present invention set up to non-destructively test a longitudinally extending object, in this case, the fuselage of a commercial airliner. In particular, the airplane fuselage 1 has a top 3, a bottom 5, a port side 7 and a starboard side 9.

The airplane fuselage 1 may be surrounded by a plurality of test stations, in this case, for ease of illustration, one test station, defined by support pylons 11S, 13P, 15S and 17P. As will be explained hereinafter, smaller aircraft may require one test station and larger aircraft may require additional test stations (as shown in phantom lines in FIG. 2), due to differences in the size of airplane fuselages, in order to simultaneously view all of the fuselage. Alternatively, a single test station may be moved relative to the fuselage to sequentially examine sections of the fuselage (e.g., the pylons shown in dark lines in FIG. 2 could be moved to the locations shown in phantom lines).

As may best be seen in FIGS. 1A and 1B, the first test station comprises support pylons 11S and 15S and support pylons 13P and 17P, which are disposed on opposite sides of the airplane fuselage 1 from one another, and a high power pulsed laser 23. The laser 23 is optically connected via optical pathways 25 and 27 to optical junctions 29, 31, 29' and 31', respectively, mounted on support pylons 11S, 13P, 15S and 17P, respectively. Also mounted on support pylon 11S is a projector 33 for illuminating a top starboard side quadrant 35 of the airplane fuselage 1 with a reference interference pattern. The projector 33 is optically connected to laser 23, via optical junction 29", optical pathway 37, optical junction 29 and optical pathway 25, so as to illuminate the top starboard side quadrant 35 of the airplane fuselage with a reference interference pattern upon receipt of a laser pulse from laser 23. A further projector 39 for illuminating a bottom port side quadrant 41 of the airplane fuselage 1 with a reference interference pattern is also provided on support pylon 11S. Projector 39 is optically connected to laser 23, via optical junction 29 and optical pathway 25, so as to illuminate the bottom starboard side quadrant 41 of the airplane fuselage with a reference interference pattern upon receipt of a laser pulse from laser 23.

A holographic recorder 45 is mounted on support pylon 15S for recording a holographic image of the top starboard side quadrant 35 of the airplane fuselage. The holographic recorder 45 is optically connected to the laser 23, via optical junction 29''', optical pathway 47, optical junction 29 and optical pathway 25, so as to record such a holographic image when the top starboard side quadrant 35 is illuminated with the reference interference pattern by projector 33.

A further holographic recorder 49 is mounted on support pylon 15S for recording a holographic image of the bottom starboard side quadrant 41 of the airplane fuselage 1. Holographic recorder 49 is optically connected to laser 23, via optical junction 29, and optical pathway 25, so as to record such a holographic image when the bottom starboard side quadrant 41 is illuminated with the reference interference pattern by projector 39.

In a similar manner projectors 53 and 55 are mounted on support pylon 13P so as to project reference interference patterns on a top port side quadrant 57 and a bottom port side quadrant 59 of the airplane fuselage. Projector 53 is optically connected to laser 23 via optical junction 31", optical pathway 61, optical junction 31 and optical pathway 27, and projector 55 is optically connected to laser 23 via optical junction 31 and optical pathway 27, so as to illuminate the respective top and bottom port side quadrants of the airplane fuselage with reference interference patterns upon receipt of a laser pulse from laser 23.

Holographic recorders 65 and 67 are mounted on support pylon 17P for recording holographic images of top port side quadrant 57 and bottom port side quadrant 59, respectively, when these quadrants are illuminated by projectors 53 and 55, respectively. For this purpose, holographic recorder 65 is optically connected to laser 23 via optical junction 31,,,, optical pathway 69, optical junction 31, and optical pathway 27, and holographic recorder 67 is optically connected to laser 23 via optical junction 31, and optical pathway 27.

Alternatively, optical junctions 29, 29', 29", 29''', 31, 31', 31" and 31'''may be replaced by high power pulsed lasers 89, 89", 89", 89''', 91, 91', 91" and 91''', respectively, and laser 23 may be replaced by controller 101, in which case optical pathways 25, 27, 37, 47, 61 and 69 are replaced by electric cables 103, 105, 107, 109, 111 and 113, respectively. Thus, controller 101 may cause pulsing of any one or more of the lasers, as desired.

Typically, optical pathways 25, 27, 37, 47, 61 and 69 merely designate line of sight paths between various optical junctions and the laser 23, the optical junctions generally comprising suitable arrangements of a mirror or mirrors to redirect and/or split an incident laser beam. However, in certain cases, the optical pathways can comprise fiber optic passages.

Figure 3:
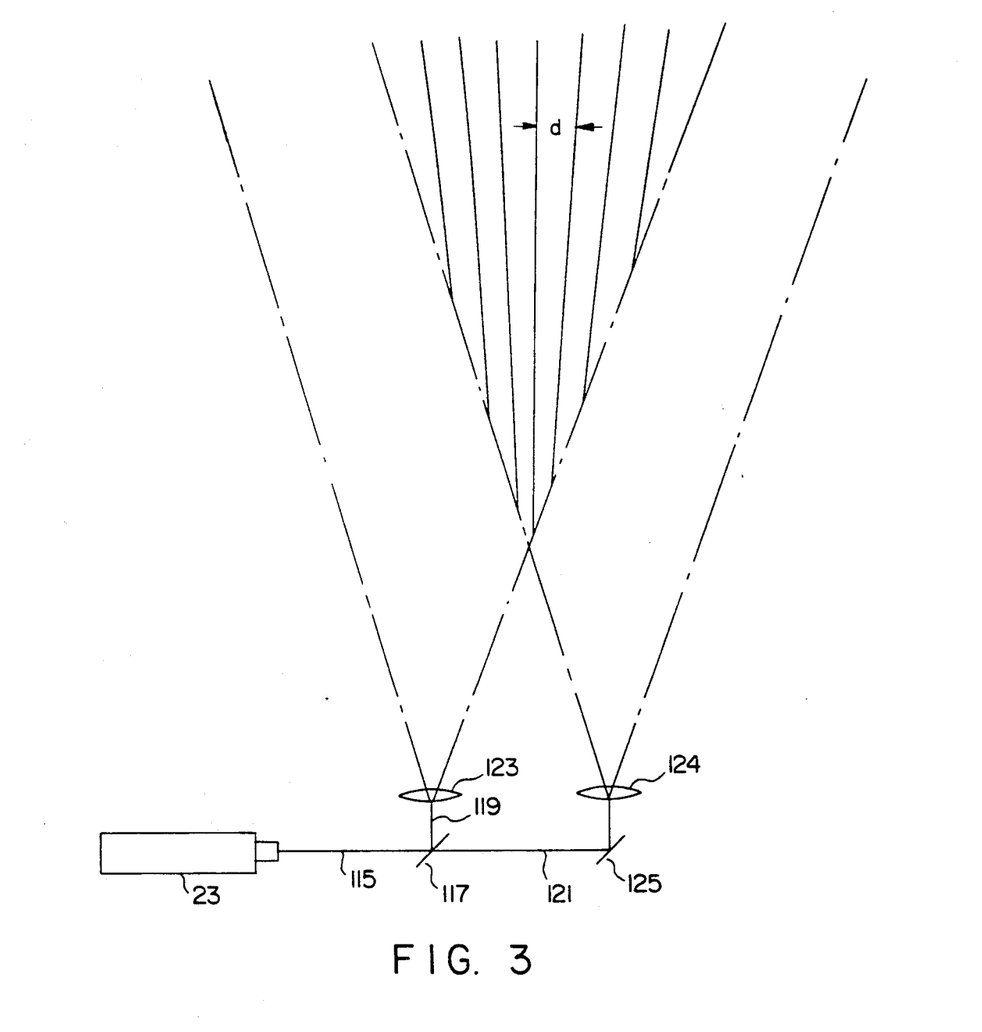
FIG. 3 is a schematic diagram illustrating the generation of a reference interference pattern according to the present invention.

FIG. 3 illustrates the principle behind the projectors (such as projector 53) of the present invention. In particular, a laser beam 115 emanating from laser 23 is split, by a beam splitter such as half-silvered mirror 117, into a first beam 119 and a second beam 121. The first beam 119 is passed through lens 123 to cause spreading of the beam; and the second beam 121 is reflected from mirror 125 so as to be parallel to the first beam and then passed through a lens 127 to cause spreading of the second beam. The interference between the two "spread" beams of light produces sheets of light separated by bands of darkness having a spacing "d" (greatly exaggerated in FIG. 3). This is exactly the pattern generated by the classic physics experiment called "Young's Fringes" which illustrates the fringe pattern experienced beyond two pinhole apertures. The coherent source of light available from a laser simply making this pattern easier to obtain than from an original non-coherent source. These fringes (lines) will be oriented perpendicular to the line between the beam sources.

Of course, such a fringe pattern could also be formed by intersecting the first and second beams at an angle and passing the resultant intersected beam through a lens to spread it over the surface of the aircraft fuselage.

Figure 4:
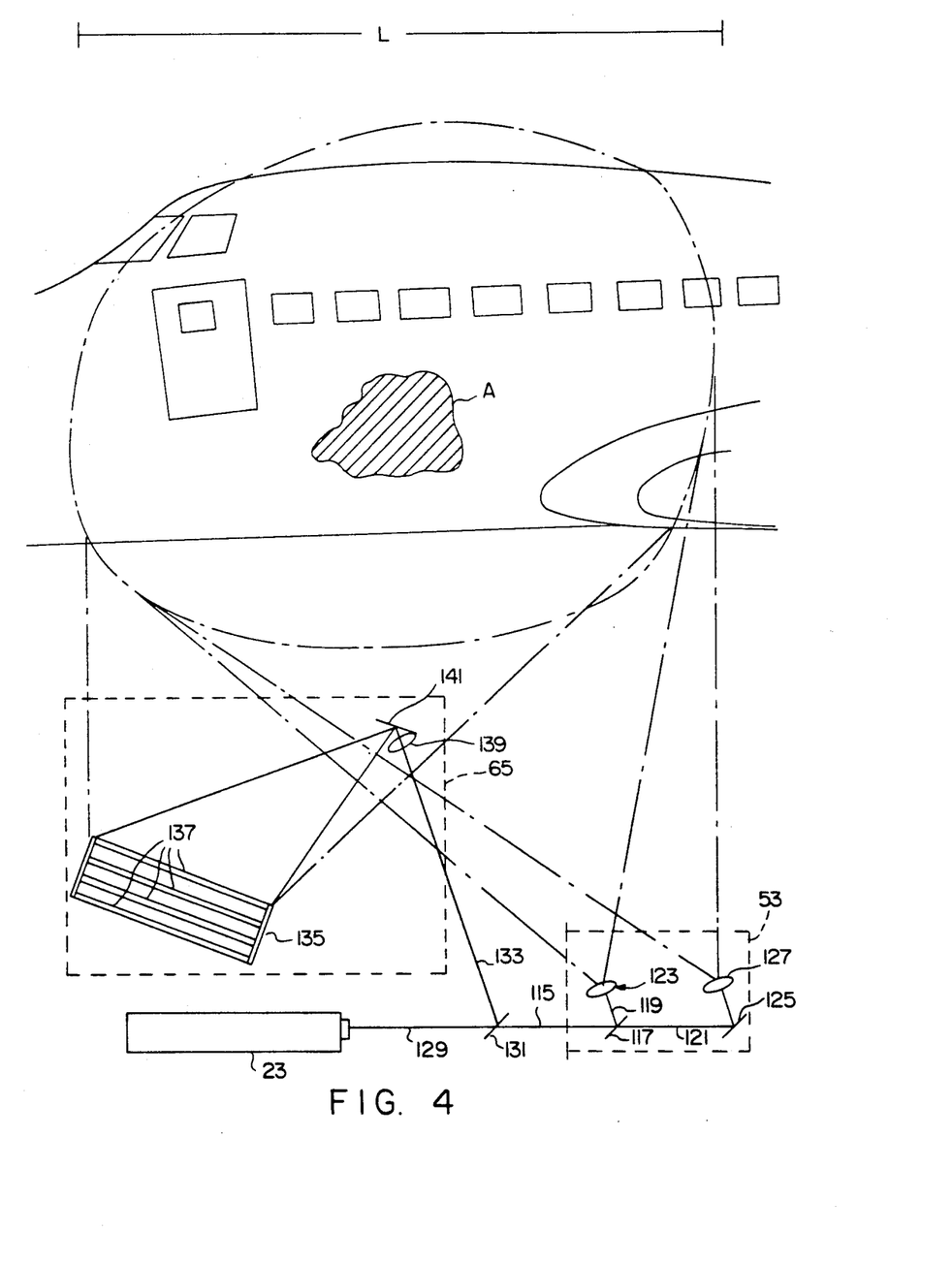
FIG. 4 is a combined portrait view of an object undergoing non-destructive testing according to the present invention and a top schematic view of apparatus, according to the present invention, for carrying out such testing.

FIG. 4 illustrates the principle behind the taking of a holographic image of a quadrant of the airplane fuselage surface. In particular, laser 23 provides a beam of light 129 which is split, such as by half-silvered mirror 131 into a reference beam 133 which is fed to holographic recorder 65 and a beam 115 which is fed to projector 53. As previously described, the projector projects the interference fringes as a pattern of lines (greatly magnified at A) onto a predetermined length L of the selected quadrant of the airplane fuselage (illustrated by the dot-dash circle). Typically, L is about 20 to 40 feet, preferably about 30 feet.

Holographic recorder 65 contains a holographic recording medium magazine 135, which may contain one or more, typically four, holographic recording media, such as photographic plates 137, which may be exposed sequentially to a view of the illuminated predetermined length of the quadrant of the airplane fuselage. Simultaneously with such exposure to the illuminated quadrant, the recording medium is exposed to reference beam 133 which is after passage through lens 139 and reflection off of mirror 141 spreads over the exposed surface of the photographic plate. Thus, a single pulse of the laser 23 provides both illumination of the aircraft fuselage and a reference beam for laser holography.

Figure 5:
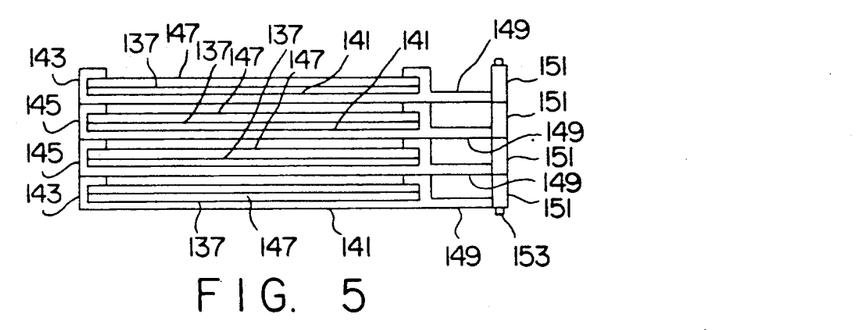
FIG. 5 is a top view of a holographic recording media magazine according to the present invention.
Figure 6:
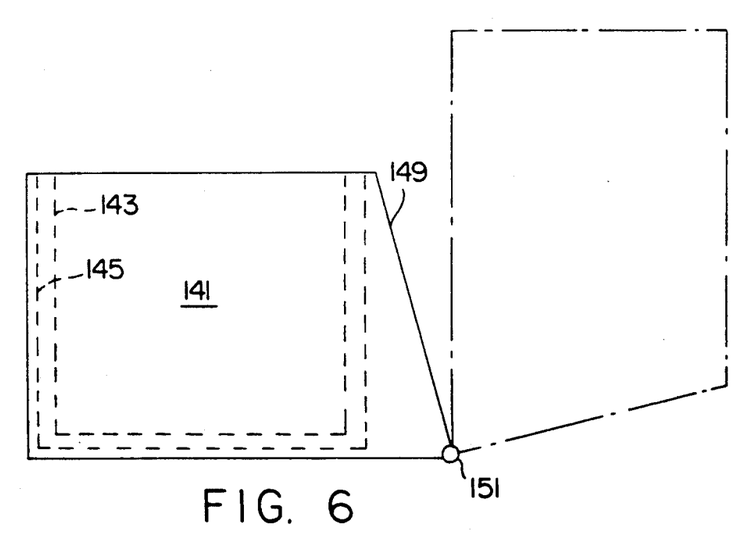
FIG. 6 is a back side view of a holographic recording media magazine according to the present invention.

FIGS. 5 and 6 illustrate a manually operated device for sequential exposure of the photographic plates 137. In particular, a planar, substantially rectangular member 141 has an L-shaped flange 143 formed about three sides thereof to form a groove 145. A photographic plate 137 may be slid into this groove along with a protective cover 147. When a hologram is to be taken, the protective cover is slid out of the groove 145 to expose the photographic plate 137, the plate is exposed, and then the cover is replaced. In order to take multiple holograms, the planar member is provided with a planar extension 149 to which is affixed a hollow transverse extension 151 receivable of a bolt 153 whereby a plurality of members 141 may be hingedly connected. Thus, as a photographic plate is exposed, it and its holder (member 141) may be swung out of the way as shown in phantom lines in FIG. 6. As would be obvious, the device is operated within a light protective housing (not shown) with a manually or remotely operated entrance shutter.

In use, the above-described apparatus is utilized to take a series of holographic images of the surface of the fuselage of the airplane at different times and under different stress conditions illuminated by the reference interference pattern. Typically, with the interior of the fuselage under ambient atmospheric pressure, two holograms are taken on separate recording media. The time interval between these recordings is not critical but is typically only limited by the pulse frequency of the laser and the ability to exchange recording media. Then the aircraft fuselage is pressurized to superatmospheric pressure, e.g., 5-10 psig, and two additional holograms are taken on separate recording media. Of course, the pressurization cycle could be reversed, i.e. initial pressurization followed by depressurization, e.g., to ambient pressure. The apparatus of the present invention may be set up in a maintenance hangar, which advantageously has been darkened to enhance contrast, most advantageously the holograms may be taken at night so as to minimize the need for suppression of extraneous light.

What is claimed is:

1. A method of non-destructively testing an object to determine the presence of areas of non-uniform strain, comprising:
   (a) projecting a reference interference pattern on a surface of an object to be non-destructively tested for areas of non-uniform strain, said object being in a first stressed condition;
   (b) recording a first hologram of said surface, with said reference interference pattern projected thereon, at a first time in said first stressed condition on a first holographic recording medium;
   (c) recording a second hologram of said surface, with said references interference pattern projected thereon, at a second time in said first stressed condition on a second holographic recording medium;
   (d) inducing a second state of stress in said object to put said object into a second stressed condition;
   (e) recording at least one additional hologram of said surface, with said reference interference pattern projected thereon, in said second stressed condition;
   (f) holographically reconstucting the surface by superposing said first and second holograms to generate a moire pattern revealing normal surface irregularities of said surface of the object in said first stressed condition; and
   (g) superposing one of said first and second holograms and one of said at least one additional hologram to generate a moire pattern revealing non-uniform areas of stress-induced strain on said surface o said object.

2. The method of claim 1, wherein said recording step (e) comprises:
   (i) recording a third hologram of said surface, with said reference interference pattern projected thereon, at a first time in said second stressed condition on a third holographic recording medium; and
   (ii) recording a fourth hologram of said surface, with said reference interference pattern projected thereon, at a second time in said second stressed condition on a fourth holographic recording medium.

3. The method of claim 2, further comprising:
   (h) superposing said third and fourth holograms to generate a moire pattern revealing normal surface irregularities of said object in said second stressed condition.

4. The method of claim 1, wherein said step (a) comprises illuminating said object with two substantially coherent light beams to project an interference pattern of said light beams on said surface.

5. The method of claim 1, wherein said object comprises the fuselage of a commercial airplane and said first stressed condition comprises maintaining the interior of said fuselage at ambient atmospheric pressure.

6. The method of claim 5, wherein said second stressed condition comprises maintaining the interior of said fuselage at superatmospheric pressure.

7. The method of claim 1, wherein said object comprises the fuselage of a commercial airplane and said first stressed condition comprises maintaining the interior of said fuselage at superatmospheric pressure.

8. The method of claim 7, wherein said second stressed condition comprises maintaining the interior of said fuselage at ambient atmospheric pressure.

9. An apparatus for non-destructive testing of a longitudinally extending object, having a top, a bottom, a pore side, a starboard side, and a surface area defined by a top port side quadrant, a top starboard side quadrant, a bottom port side quadrant and a bottom starboard side quadrant, to determine the presence of areas of non-uniform strain, comprising at least one test station, which comprises:
   laser means for generating a pulsed laser beam;
   first projection means, optically operatively connected to said laser means, for projecting a first reference interference pattern on a predetermined area of said top port side quadrant of said object to illuminate said predetermined area of said top port side quadrant of said object, upon receipt of a laser pulse;
   second projection means, optically operatively connected to said laser means, for projecting a second reference interference pattern on a predetermined area of said top starboard side quadrant of said object to illuminate said predetermined area of said top starboard side quadrant of said object, upon receipt of a laser pulse;
   third projection means, optically operatively connected to said laser means, projecting a third reference interference pattern on a predetermined area of said bottom port side quadrant of said object to illuminate said predetermined area of said bottom port side quadrant of said object, upon receipt of a laser pulse;
   fourth projection means optically operatively connected to said laser means, for projecting a fourth reference interference pattern on a predetermined area of said bottom starboard side quadrant of said object to illuminate said predetermined area of said bottom starboard side quadrant of said object, upon receipt of a laser pulse;

first holographic recording means, optically operatively connected to said laser means for recording a holographic image of said predetermined area of said top port side quadrant of said object when said predetermined area of said top port side quadrant of said object is illuminated by said first projection means;

second holographic recording means, optically operatively connected to said laser means, for recording a holographic image of quadrant of said object when said predetermined area of said top starboard side quadrant of said object is illuminated by said second projection means;

third holographic recording means, optically operatively connected to said laser means, for recording a holographic image of said predetermined area of said bottom starboard side quadrant of said object when said predetermined area of said bottom starboard side quadrant is illuminated by said fourth projection means.

10. The apparatus of claim 9, wherein said apparatus comprises a plurality of said test stations for testing additional predetermined areas.

11. The apparatus of claim 10 comprising three test stations.

12. The apparatus of claim 11, wherein said object is a fuselage of an airplane.

13. The apparatus of claim 9, wherein each of said projection means comprises beam splitter means for splitting a pulsed laser beam received from said laser means into a first beam and a second beam;

first lens means for projecting said first beam onto said predetermined area of a respective quadrant of said object;

second lens means for projecting said second beam onto said predetermined area of said respective quadrant of said object;

14. The apparatus of claim 9, wherein each of said holographic recording means comprises magazine means for holding a plurality of holographic recording media and for successively exposing each of said plurality of holographic recording media to light from a respective projection means reflected from said predetermined area of a respective quadrant of said object;

reference beam means, optically operatively connected to said laser means, for exposing each of said holographic recording media to light from said laser means simultaneously with the exposure of each of said holographic recording media to said reflected light.

15. The apparatus of claim 14, wherein said magazine means holds four holographic recording media.

16. The apparatus of claim 9, further comprising:

first support means for supporting said first and third projection means and said first and third holographic recording means on said port side of said object; and second support means for supporting said second and fourth projection means and said second and fourth holographic recording means on said starboard side of said object.

17. The apparatus of claim 16, wherein said laser means comprises a single high power pulsed laser.

18. The apparatus of claim 16, wherein said laser means comprises a first high power pulsed laser optically operatively connected to said first and third projection means and said first and third holographic recording means; and a second high power pulsed laser optically operatively connected to said second and fourth projection means and said second and fourth holographic recording means.

19. The apparatus of claim 18, wherein said laser means further comprises a controller, operatively connected to said first and second lasers, for synchronizing pulsing of said lasers.

* * * * *